United States Patent [19]

McMillan et al.

[11] Patent Number: 5,430,338
[45] Date of Patent: Jul. 4, 1995

[54] MOTOR CASING AND METHOD OF MANUFACTURE

[75] Inventors: Douglas D. McMillan; Ronald A. Tschida, both of St. Paul, Minn.

[73] Assignee: McMillan Electric Company, Woodville, Wis.

[21] Appl. No.: 195,370

[22] Filed: Feb. 14, 1994

[51] Int. Cl.⁶ .............................................. H02K 5/00
[52] U.S. Cl. ........................................ 310/89; 310/91; 310/258
[58] Field of Search ................... 310/89, 91, 258, 263, 310/42; 174/50

[56] References Cited

U.S. PATENT DOCUMENTS

| | | |
|---|---|---|
| 3,419,957 | 1/1969 | Stone . |
| 3,714,705 | 2/1973 | Lewis ................................... 310/89 |
| 3,796,085 | 3/1974 | Fisher et al. . |
| 4,397,171 | 8/1983 | Suh et al. . |
| 4,644,204 | 2/1987 | Lakin . |
| 4,726,112 | 2/1988 | King et al. . |
| 4,758,755 | 7/1988 | Sherman et al. . |
| 4,916,344 | 4/1990 | Hammer et al. . |
| 5,073,738 | 12/1991 | Tang ..................................... 310/91 |
| 5,095,236 | 3/1992 | Walsh . |
| 5,239,221 | 8/1993 | Juan et al. ............................ 310/258 |
| 5,276,375 | 1/1994 | Hartel .................................. 310/89 |

*Primary Examiner*—R. Skudy
*Attorney, Agent, or Firm*—Merchant, Gould, Smith, Edell, Welter & Schmidt

[57] ABSTRACT

An improved electric motor casing is disclosed. The end casing includes a circular end plate and perpendicular peripheral side wall with a plurality of rectangular, internally projecting lands formed in the side wall. Each land defines a linear ledge with the plurality of linear ledges disposed in the same plane to receive and support the electric motor stator. The casing is formed by drawing a flat metal blank into the end plate and perpendicular side wall, with the plurality of rectangular lands drawn substantially simultaneously with formation of the end plate and perpendicular side wall.

13 Claims, 7 Drawing Sheets

MOTOR CASING AND METHOD OF MANUFACTURE

BACKGROUND OF THE INVENTION

The invention relates to electric motors and the manufacture thereof, and is specifically directed to an inventive motor casing and the method of its manufacture.

In the manufacture of precision electric motors, it is conventional to employ a pair of motor end casings between which a stator is clamped. A shaft to which a motor is mounted is rotatably carried by the end casings.

In this type of assembly, it is important that the stator be rigidly and stably clamped between the end casings. To that end, the side wall of the end casing has a plurality of circumferentially spaced support points which project laterally inward and lie in the same plane. These support points define a support ledge or shoulder that receives the peripheral edge of one face of the stator. The peripheral edge of the opposite face fits against the ledge of the opposed casing, with the stator thus clamped between the ledges of the opposed casings.

While such an end casing and its method of manufacture have been commercially suitable, the use of circumferential support points has created some degree of difficulty in assembling the motor because the stator must be accurately placed before the components can be clamped together, and this sometimes proves difficult based on tilting or rocking of the stator.

Further, the method of manufacturing this conventional end casing has involved three separate steps, which result in a relatively complicated process. First, a metal blank is placed between complementing dies and is drawn to form a circular end plate and peripheral side wall that extends substantially perpendicular from the end plate. Second, the end plate is pierced in a second operation to form the axial opening for the motor shaft, a circumferential pattern of cooling openings, bolt holes and other openings as may be appropriate to the particular motor. Third, the end casing is held in a stationary position and a plurality of forming points are laterally forced into the side wall by mechanized cams to form the circumferential support points. This involves the use of an additional die set as well as the additional cam mechanism to form the support points.

The invention is the result of an endeavor to produce an improved end casing as well as to simplify its method of manufacture. The improved end casing also comprises a circular end plate and perpendicular peripheral side wall, but rather than a plurality of circumferentially spaced individual support points, a plurality of rectangular, internally projecting lands are formed. Each of the lands defines a ledge or shoulder of significant length as compared to a single support point, and these shoulders are collectively disposed in the same plane to define a circumferential ledge that receives and supports the peripheral facing edge of the stator.

This circumferential ledge reduces of rocking and tilting of the stator relative to the end casing during component assembly and bolting, as well as improved stability of the motor after assembly. The rectangular shoulder lands also increase the overall strength of the end casing, and dimensional accuracy of the assembled motor is maintained not only during assembly but in shipping, handling and operation as well. Another significant improvement resulting from formation of these rectangular lands is the ability to use a smaller metal blank in forming the end casings. Further, due to increased strength and rigidity of the improved casing, a thinner metal blank can be used as compared with the prior art casing. For a significant number of motors that are manufactured, this reduction of size and thickness results in a considerable saving of material and manufacturing cost.

The method of manufacturing the improved casing also represents a significant improvement with respect to the manufacturing method used for the prior art end casing. In particular, the provision of larger rectangular lands actually created a problem since forming lands of this size by a lateral camming operation can distort and bend the casing. However, it was found that the enlarged rectangular lands could themselves be formed in a drawing operation, and that this drawing operation could be combined with the drawing operation in which the peripheral side wall is formed. This combination of operations into a single drawing step completely eliminates the lateral camming operation. This is beneficial not only from the standpoint of eliminating a manufacturing step, but also the elimination of bowing and distortion of the casing end plate during the lateral camming operation of the prior art method. By eliminating the camming operation, and combining the land formation and the drawing operation, the critical dimension of the land is much more consistent and thus better adapted to receive the stator peripheral facing edge without rocking or tilting.

Elimination of the lateral camming operation has also improved the dimensional concentricity of the end casing and reduced end play variation of the output motor shaft. As such, this method increases the quality of the product.

The foregoing improvements and advantages are in addition to those normally expected from the elimination of a manufacturing step, namely, the reduction of labor and associated savings and manufacturing costs. Overall, the improved end casing and method of its manufacture result in an end casing having less material cost and less manufacturing cost, but which is of better dimensional accuracy and of increased quality.

DESCRIPTION OF THE PRIOR ART AND PREFERRED EMBODIMENTS

Figure 1:
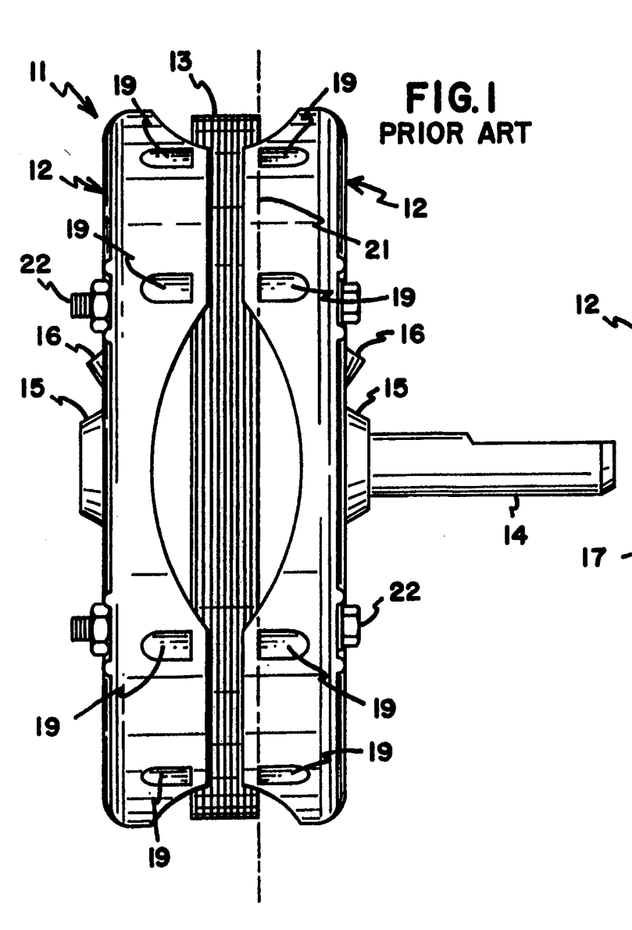
FIG. 1 is a view in side elevation of a prior art motor.

With initial reference to FIG. 1, a prior art motor is represented generally by the numeral 11. Motor 11 is formed from two identical end casings 12 between which a laminated core or stator 13 is clamped. A rotor (not shown) is mounted on a motor output shaft 14 that is rotatably carried by bearings centrally disposed in each of the end casings 12 adjacent raised annular guides 15 through which the shaft 14 projects. A lubricating hole 16 is formed in the end of casing 12 adjacent the guide 15 to permit lubrication of the bearings.

Figure 2:
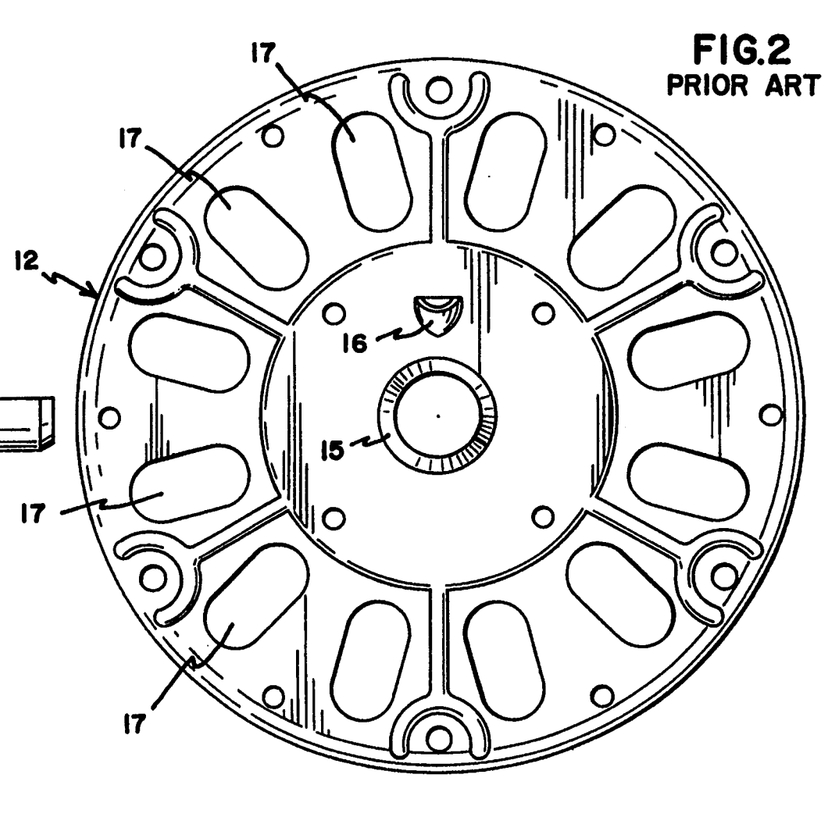
FIG. 2 is an end view of one of the motor casing for the motor of FIG. 1 as viewed from its outer face.
Figure 3:
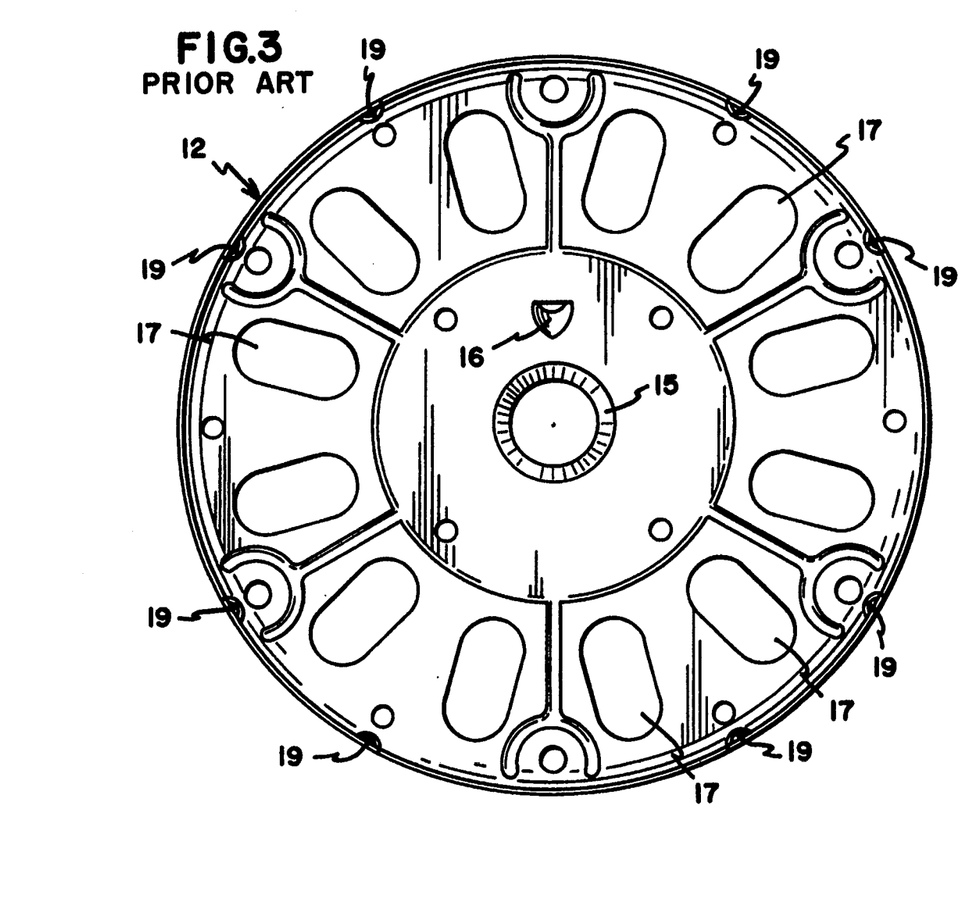
FIG. 3 is an end view of the end casing of FIG. 2 as viewed from its inner face.
Figure 4:
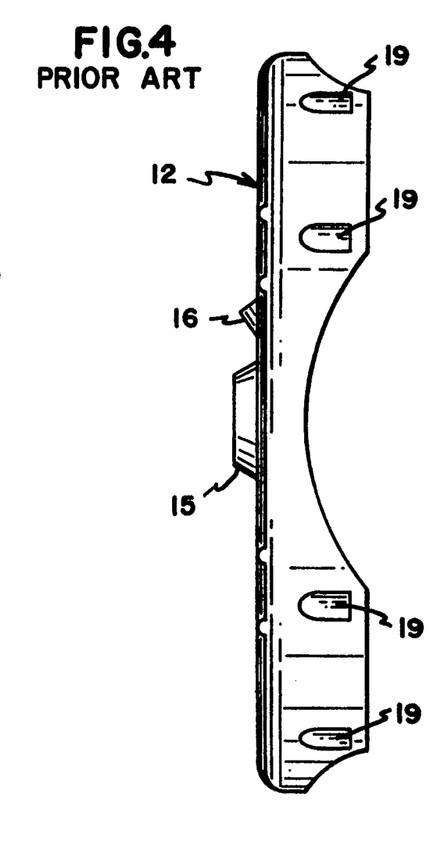
FIG. 4 is a view in side elevation of the prior art motor end casing.

With additional reference to FIGS. 2–4, a plurality of oblong openings 17 are formed in the end face of motor casing 12 in a circumferential pattern, with each of the openings extending radially outward.

With particular reference to FIGS. 1, 3 and 4, end casing 12 includes a peripheral side wall 18 that extends axially from the end face. A plurality of stator support points 19 are formed on the inner face of side wall 18 by an operation that forces a portion of the side wall 18 to project radially inward in a semi-circular configuration (see FIG. 3). In this particular embodiment, there are 8 such support points 19 that are arranged in pairs equiangularly spaced around the side wall 18.

With reference to FIGS. 1 and 4, it will be appreciated that the stator support points 19 are disposed in the same plane (see reference numeral 21 in FIG. 1) to support one peripheral facing edge of the stator 13. The opposite peripheral facing edge of stator 13 is received and supported by the stator support points 19 of the opposite end casing 12, permitting the stator 13 to be sandwiched between the motor end casings 12 and clamped in place by a plurality of threaded bolts and nuts 22.

Each of the prior art end casings 12 is formed in a conventional three-step process from a flat metal blank of uniform thickness. The first step involves placing the blank in a die and drawing the blank to bend the peripheral side wall 18 at a right angle relative to the end face. The lubricating opening 16 is also formed in this drawing step. After this is accomplished, the end casing is mechanically pierced to form cooling openings 17 and various other openings to accommodate the shaft 14, bolts 22 and the like. The third step is to form the support points 19 by a camming operation in which the end casing 12 is held in a stationary position and a plurality of forming points are laterally forced into the side wall 18 by mechanized cams.

These three manufacturing steps are separately performed, and each step requires a different mechanical operation. After the three-step operation, the various components of motor 11 can be assembled and bolted together place as shown in FIG. 1.

Figure 5:
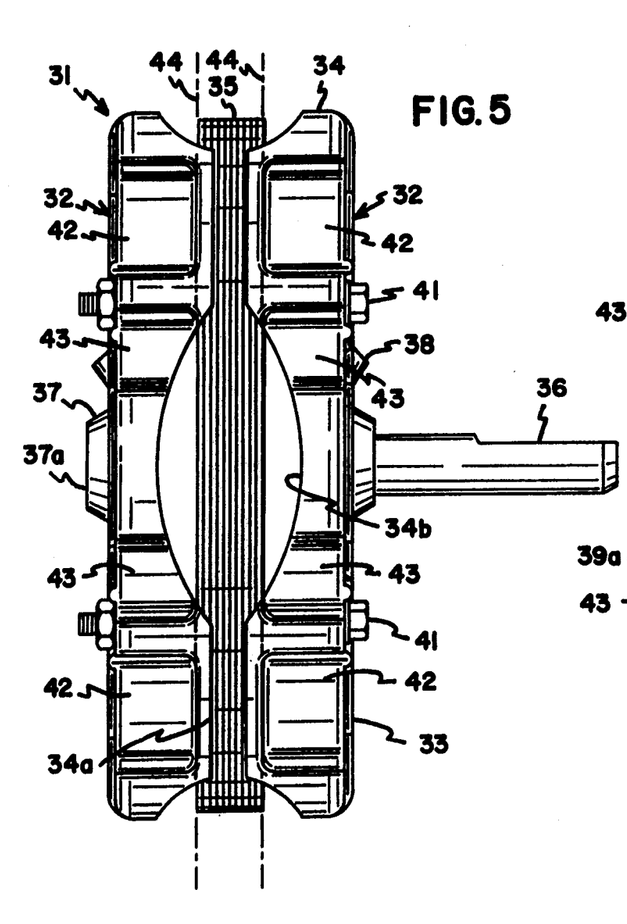
FIG. 5 is a view in side elevation of an electric motor which utilizes two of the inventive end casings.

With reference to FIG. 5, an improved motor represented generally by the numeral 31 utilizes motor end casings 32 that embody the inventive principle. Each of the casings 32 broadly comprises a generally circular end plate 33 and a peripheral side wall 34 that is concentric with and extends generally in an axial direction from the end plate 33. In the preferred embodiment, side wall 34 extends perpendicularly from end plate 33.

Motor 31 includes the same or a similar stator 35 and a rotor (not shown) mounted on an output shaft 36. The shaft 36 is rotatably mounted in bearings centrally carried in each of the end casings 32 adjacent raised annular guides 37, each of which defines an axial opening 37a for shaft 36.

Figure 6:
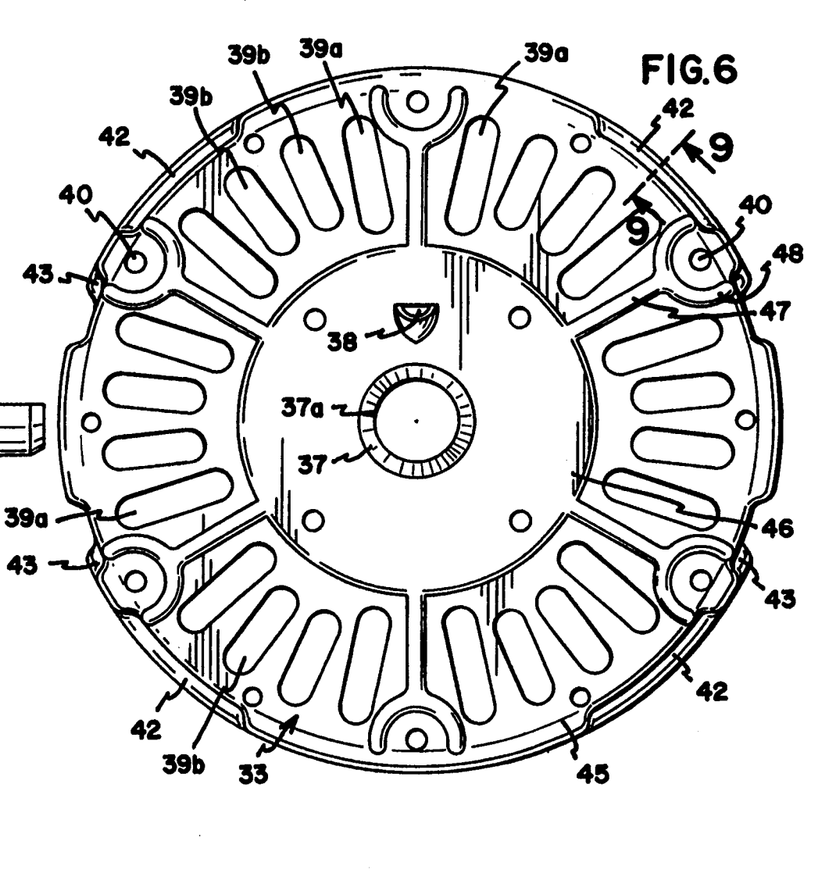
FIG. 6 is an end view of the motor end casing of FIG. 5 as viewed from its outer face.

End casing 32 also includes a lubricating opening 38 and a plurality of oblong cooling openings 39a, 39b, which are circumferentially oriented within its end face as shown in FIG. 6. A plurality of bolt holes 40 are formed around the periphery of the circular end plate 33, which receive a plurality of bolt/nut pairs 41 as shown in FIG. 5.

As described to this point, end casing 32 is structurally similar to the prior art end casing 12 although the number of cooling openings 39a, 39b is increased and their configuration and pattern is modified.

With continued reference to FIGS. 5–9, a plurality of circumferentially elongated and circumferentially spaced lands 42, 43 are formed in the side wall 34. Specifically, each of the lands 42, 43 is rectangular in shape, comprising a recess as viewed from the external or outer side of side wall 34 (see FIGS. 5 and 6) and a radially inward projection as viewed from the inner side of side wall 34 (see FIGS. 7 and 8). As best showing FIG. 5, the lands 42, 43 begin at the juncture of circular end plate 33 and peripheral side wall 34. In the preferred embodiment, there are four each of rectangular lands 42, 43, and they are arranged in opposed pairs on opposite sides of four of the six bolt holes 40. Lands 43 are of the same height (or axial dimension) and depth (inwardly projecting dimension) as the lands 42, but based on spacial considerations the lands 43 have a lesser width or circumferential dimension than that of lands 42. This is a dimensional choice which is not critical to the invention, and it is within the scope of the invention to form lands 42, 43 to be of the same size.

Figures 7, 8:
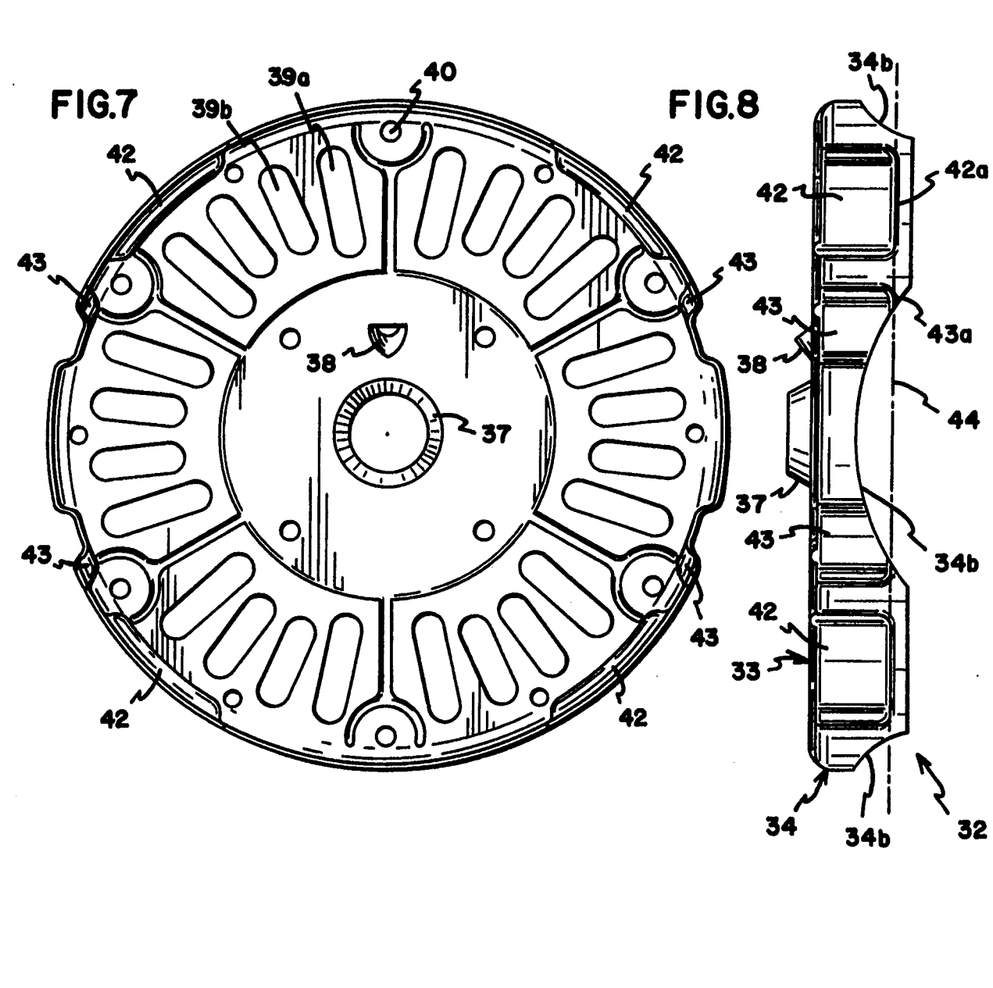
FIG. 7 is an end view of the motor end casing of FIG. 5 as viewed from its inner face.
FIG. 8 is a view in side elevation of the inventive motor end casing.
Figure 9:
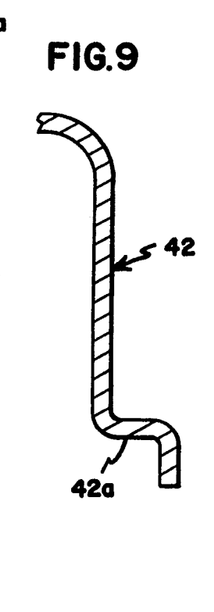
FIG. 9 is an enlarged fragmentary sectional view taken along the line 9—9 of FIG. 6.

With particular reference to FIG. 8, which shows the rectangular lands 42, 43 as internal projections, it is of structural significance that each of the lands 42 defines a linear ledge or shoulder 42a (see also the enlarged fragmentary sectional view of FIG. 9) and each of the lands 43 defines a linear ledge or shoulder 43a. The several shoulders 42a, 43a are disposed in the same plane, as indicated by reference numeral 44 in FIGS. 5 and 8, and together define a circumferential support ledge for one of the peripheral facing edges of stator 35.

It has been found that providing a circumferential ledge as constructed for the stator 35 results in a number of significant improvements as compared with the stator support points 19 of the prior art motor 11. These include the reduction of rocking and tilting of the stator relative to the end casings 32 during the bolting assembly step, and improved stability of the motor 31 after assembly. The shoulder lands 42, 43 also increase the overall strength of the motor case 32, and dimensional accuracy of the assembled motor is maintained throughout all phases, including assembly, shipping, handling and operation.

An unexpected result from formation of the lands 42, 43 is the ability to use a smaller metal blank from which each of the end casings 32 is formed. The increased strength and rigidity of the end casing 32 also allow a metal blank of thinner stock to be used in its formation. Extrapolated over the significant number of motors manufactured, the use of a smaller and thinner metal blank results in a considerable saving of both material and manufacturing cost.

End plate 33 comprises a first annular portion 45 which lies in a single plane and in which the cooling openings 39a, 39b are formed. Elevated slightly above the annular portion 45 is a smaller but concentric annular portion 46. Projecting radially outward from the annular portion 46 and in the same plane is a plurality of ridges 47 each of which terminates in a semi-circular bifurcation 48 which defines and partially encircles the bolt hole 40. The elevated annular portion 46, ridges 47 and bifurcations 48 strengthen the end plate 33, and in particular the bifurcations 48 strengthen the area immediately surrounding the bolt hole openings 40.

Annular guide 37 and lubricating opening 38 both project above (i.e., beyond the face of) elevated annular portion 46.

The method of manufacturing end casings 32 also represents a significant improvement with respect to the manufacturing method described in connection with prior art end casings 11. In particular, the construction of end casing 32 lends itself to a two-step operation which eliminates the lateral camming step of the prior art method.

With reference to FIGS. 10-14, a die set comprising a lower die (FIG. 10) and upper die (FIG. 11) is used to draw a metal blank 53 into the configuration of end casing 32. Lower die 51 comprises a substantially solid cylindrical body 53 having an annular top face 54 and a generally cylindrical side wall 55. Top face 54 lies in a single plane, but slightly raised therefrom is a concentric annular platform 56 and a plurality of equiangularly spaced ridges 57 that extend radially outward therefrom. Each of the ridges 57 terminates in a semi-circular bifurcation 58 which defines the position for a bolt hole 40. The annular platform 56, ridges 57 and bifurcations 58 all lie in the same plane slightly above the annular top face 54. For purposes of clarity, these components are not shown in FIGS. 12-17.

A dome-shaped projection 59 extends above the annular platform 56 (see also FIG. 12) at its center. The projection 59 takes the form of a truncated hemisphere, including an annular arcuate side wall 59a and a flat top 59b.

Figure 10:
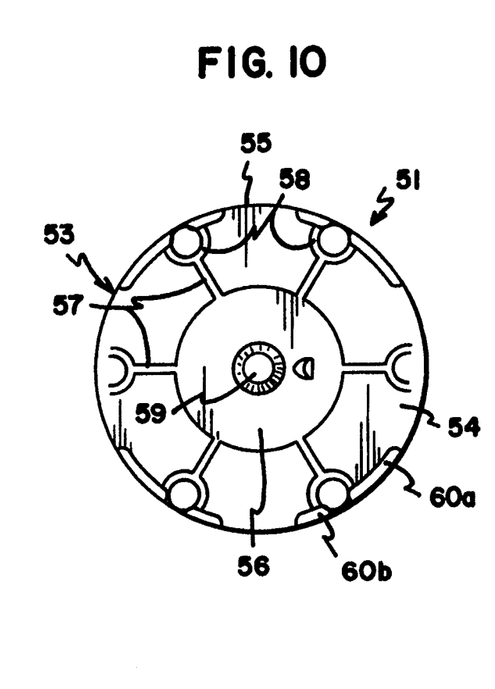
FIG. 10 is a view in top plan of one die of a die set used in drawing the inventive motor end casing.
Figure 12:
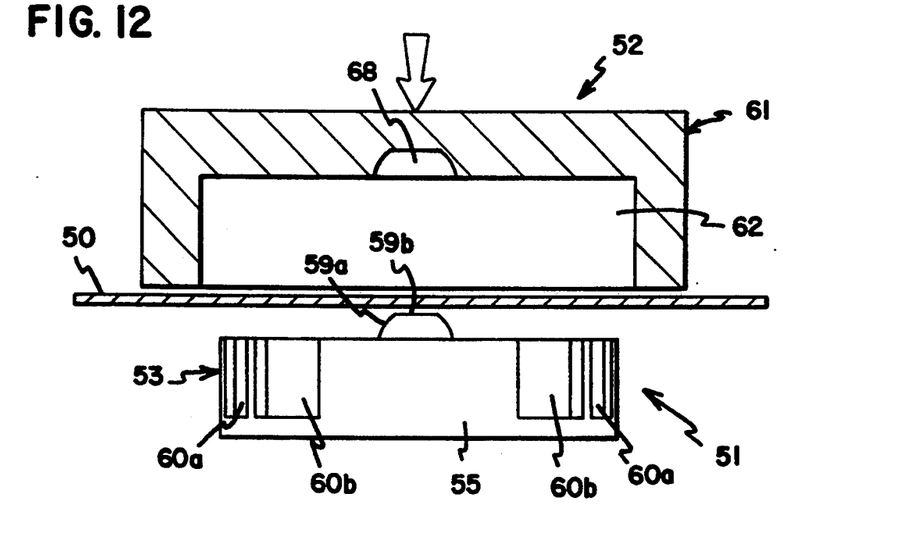
FIGS. 12–14 are generally diagrammatic views of the progressive steps of a drawing operation forming the inventive motor end casing.

With reference to FIGS. 10 and 12, pluralities of rectangular recesses 60a, 60b are formed in the outer cylindrical side wall 55. These recesses 60a, 60b are of the same height or axial dimension and the same depth, but recess 60a has a greater circumferential dimension than that of recess 60b. The recesses 60a, 60b are arranged in opposed pairs with respect to four of the six bifurcations 58.

With reference to FIGS. 11-14, the complementing upper die 52 comprises a cylindrical body 61 having a smaller, centrally disposed cylindrical recess formed in its under side. The diameter of recess 62 is larger than the diameter of die 51 by approximately the thickness of metal blank 53.

Figure 11:
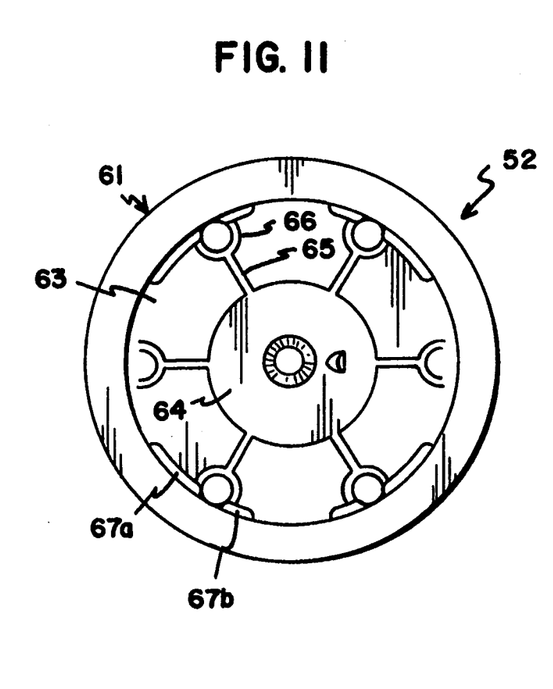
FIG. 11 is a view in top plan of the opposite die of the die set.

As best shown in FIG. 11, the inner top surface of recess 62 includes an annular planar portion 63 with a smaller but concentric annular portion 64 machined to define a shallow recess with respect thereto. Radially projecting grooves 65 terminating in semi-circular grooves 66 are also recessed from the annular portion 63.

With reference to FIGS. 11 and 12, a plurality of rectangular members 67a, 67b project radially inward from the inner cylindrical surface defining recess 62.

The members 67a, 67b are of the same height or axial dimension (see FIG. 12) and thickness (FIG. 11), but they differ in circumferential dimension with members 67b being smaller than members 67a. The members 67a, 67b are disposed in opposed pairs relative to four of the six semi-circular grooves 66.

With continued reference to FIGS. 11 and 12, a recessed dome 68 taking the form of a truncated hemisphere is centrally disposed in the upper end wall defining recess 62. The recess 68 corresponds in configuration to the dome shaped projection 59, although dimensionally it is greater in size by approximately the thickness of the metal blank 53.

Figure 13:
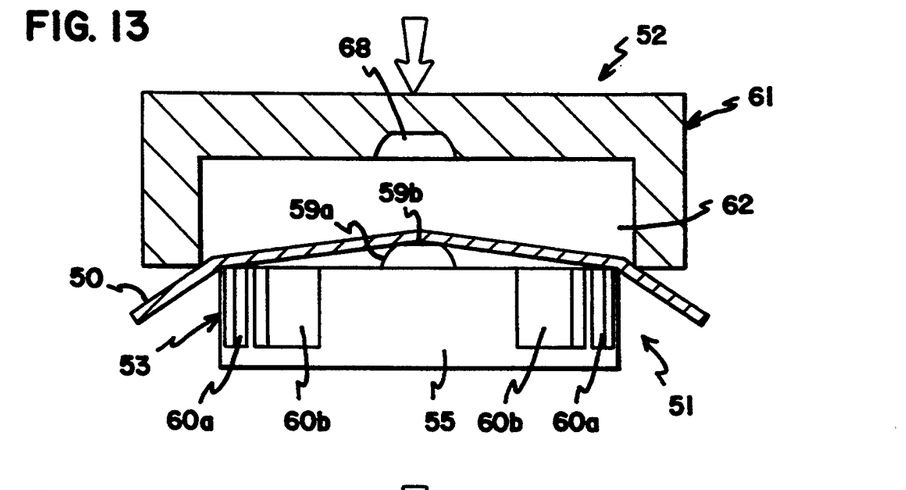
Figure 14:
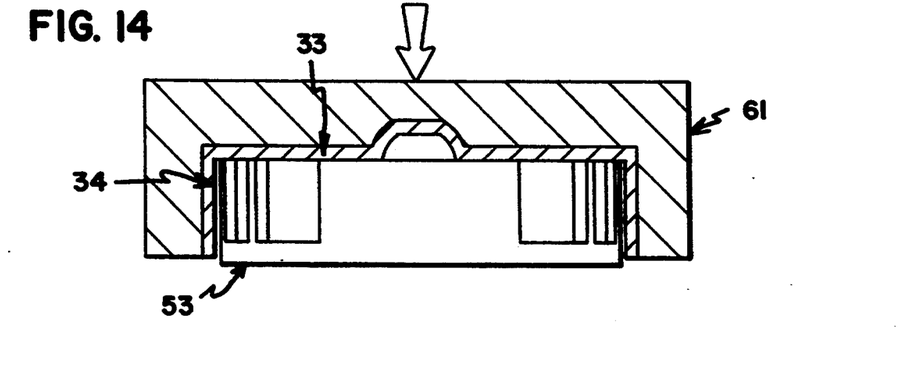

The complementing dies 51, 52 are used in a conventional drawing machine (not shown) in opposed relation, as shown in FIGS. 12-14, in the formation of an improved end casing 31. This initially involves the placement of a metal blank 53, which in the preferred embodiment is square in configuration with rounded corners. The blank 53 is centered relative to the dies 51, 52, as shown in FIG. 12, and the drawing machine is then actuated to force the dies 51, 52 together.

As shown in FIG. 13, this initially causes the outer or peripheral portions of the metal blank 53 to begin bending downward, while the central portion of the blank 53 begins to bend relative to the dome shaped projection 53.

As the drawing stroke is completed, the formation of side wall 34 in perpendicular relation to the end plate 33 is likewise completed. As shown in FIG. 8, side wall 34 includes four arcuate recesses 34a, which result from forming the circular end wall 34 from a square metal blank 53. End wall 33 is likewise formed in a substantially planar configuration, it being noted that formation of the detailed portions of end plate 33, consisting of concentric annular portions 45, 46, ridges 47 and bifurcations 48, are likewise formed at this time. Lubricating opening 38 is also formed in the drawing step.

Figure 15:
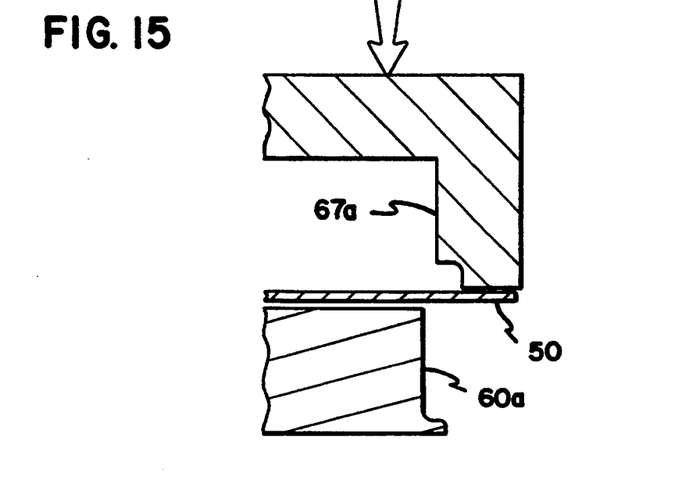
FIGS. 15–17 are enlarged, fragmentary sectional views of progressive steps of the drawing operation specifically showing the formation of circumferential lands.
Figure 16:
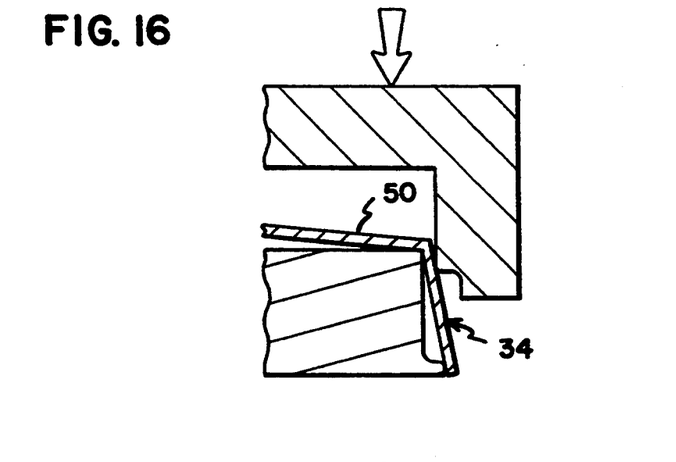
Figure 17:
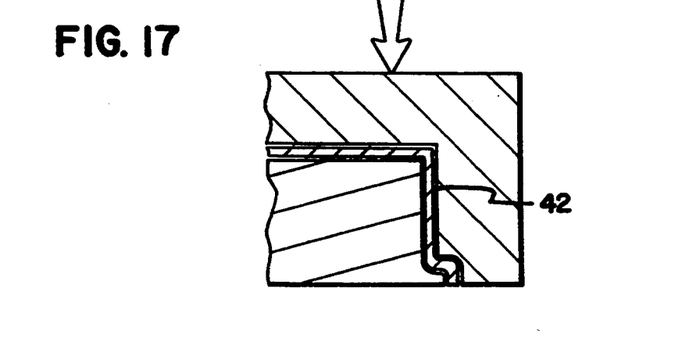

FIGS. 15-17 specifically disclose the drawing formation of the lands 42, 43 in the side wall 34 of casing 32. Specifically, the rectangular projections 67a of upper die 52 matably enter the rectangular recesses 60a of lower die 51, the clearance corresponding to the thickness of metal blank 53.

As shown in FIG. 16, the side wall 34 is in an intermediate stage of formation, and as shown in FIG. 17 the drawing operation is complete with the formation of a rectangular land 42. The projections 67b mate correspondingly with the recesses 60b to form the rectangular lands 43. As such, the lands 42, 43 begin at the juncture of end plate 33 and side wall 34, and extend axially a distance less than the maximum distance of side wall 34.

The metal blank used in the process is preferably square with rounded corners. This results in a peripheral side wall 34 that has a flat lower edge 34a with shallow arcuate recesses 34b (see FIG. 5). The larger rectangular lands 42 are disposed in that portion of side wall 34 of maximum axial dimension, whereas the smaller rectangular lands 43 in part intersect the shallow arcuate recesses 34b.

With separation of the dies 51, 52, the formed end casing 31 may be removed and placed in a conventional piercing mechanism (not shown), which pierces the end plate 33 to form the various openings including cooling openings 39a, 39b, axial shaft opening 37a and bolt holes 40.

With completion of this second step, formation of the end casing 32 is likewise complete. Preferably, the end casings 32 are painted before assembly into a motor 31.

Assembly of the motor 31 is simplified considerably based on the presence of the lands 42, 43. With a rotor mounted on shaft 36, this assembly is inserted into a stator 35, and with other motor components included, two end casings 32 are brought together with opposite peripheral facing edges of the stator 35 engaging the lands 42, 43 of the opposed casings 32. This gives rise to a stable assembly, avoiding rocking and tipping at the time nuts and bolts 41 are inserted. Upon tightening of the nut/bolt assemblies 41, the motor 31 is completed. As constructed, the motor 31 has increased overall strength and its dimensional accuracy is maintained throughout its life.

What is claimed is:

1. A casing for an electric motor comprising two such casings and a stator supported therebetween, said casing comprising:
   an end plate of generally circular configuration having a predetermined axis;
   a peripheral side wall concentric with and extending substantially axially from said end plate;
   a plurality of circumferentially elongated lands formed in said peripheral side all in circumferentially spaced relation therearound, each of said lands projecting radially inward and defining a linear ledge disposed in a predetermined plane, with said plurality of linear ledges disposed in the same plane to receive and support said stator; and
   a shaft opening formed in an axial center of said end plate.

2. The casing defined by claim 1, wherein said peripheral side wall is substantially perpendicular to said end plate.

3. The casing defined by claim 1, wherein said circumferentially elongated lands are rectangular in configuration.

4. The casing defined by claim 3, wherein the axial dimension of said lands is less than the greatest axial dimension of said peripheral side wall.

5. The casing defined by claim 4, wherein each of said rectangular lands begins at a juncture of said end plate and peripheral side wall and extends axially therefrom.

6. The casing defined by claim 3, which comprises first and second pluralities of said rectangular lands, said first and second pluralities of said rectangular lands having the same axial dimension, and a circumferential dimension of said first plurality of said rectangular lands being greater than said second plurality of said rectangular lands.

7. The casing defined by claim 6, wherein said lands are disposed in pairs with one of each said first and second pluralities defining a pair of lands.

8. The casing defined by claim 7, wherein the end plate comprises a plurality of bolt openings formed in an outer peripheral edge thereof, each bolt opening being disposed between a pair of lands.

9. The casing defined by claim 8, wherein an edge of said peripheral side wall comprises flat portions with alternating recessed arcuate portions, and said second plurality of rectangular lands intersect said recessed arcuate portions in part.

10. A casing for an electric motor comprising two such casings and a stator supported therebetween, said casing comprising:
    an end plate of generally circular configuration having a predetermined axis;
    a peripheral side wall concentric with and extending substantially axially from said end plate;
    a plurality of circumferentially elongated lands formed in said peripheral side wall in a circumferentially spaced relation therearound, each of said lands projecting radially inward and defining a linear ledge disposed in a predetermined plane, with said plurality of linear ledges disposed in the same plane to receive and support said stator, and each of said lands beginning at a juncture of said end plate and peripheral side wall and extending axially therefrom; and
    a shaft opening formed in an axial center of said end plate.

11. The casing defined by claim 10, wherein said peripheral side wall is substantially perpendicular to said end plate.

12. The casing defined by claim 10, wherein said circumferentially elongated lands are rectangular in configuration.

13. The casing defined by claim 12, wherein the axial dimension of said lands is less than the greatest axial dimension of said peripheral side wall.

* * * * *